United States Patent [19]
Walther

[11] Patent Number: 5,626,384
[45] Date of Patent: May 6, 1997

[54] VEHICLE SLIDING DOOR STABILIZER

[75] Inventor: Ronald D. Walther, Jacobson, Minn.

[73] Assignee: U.S. Farathane Corporation, Utica, Mich.

[21] Appl. No.: 530,007

[22] Filed: Sep. 19, 1995

[51] Int. Cl.$^6$ ........................................................ B60J 5/06
[52] U.S. Cl. ........................................ 296/155; 296/146.1
[58] Field of Search ................................ 296/155, 146.1

[56] References Cited

U.S. PATENT DOCUMENTS

| | | | |
|---|---|---|---|
| 3,312,015 | 4/1967 | Plegat | 296/155 X |
| 4,580,823 | 4/1986 | Yamada et al. | 296/155 X |
| 4,869,544 | 9/1989 | Anwyll et al. | 296/155 |
| 4,991,905 | 2/1991 | Watanabe et al. | 296/155 |

*Primary Examiner*—Joseph D. Pape
*Attorney, Agent, or Firm*—Lalos & Keegan

[57] ABSTRACT

In vehicles, such as automobile minivans, a sliding door is sometimes provided with a stabilizer assembly that includes a male part usually attached to the sliding door and a female part usually attached to a door frame that is stationary with respect to the body of the vehicle. The stabilizer assembly helps to prevent relative movement and vibration of the sliding door while the vehicle is moving. To reduce unwanted noise generated by the stabilizer resulting from relative movement between the male and female parts while in contact, the male part is formed substantially of a urethane material and the female part is formed substantially of a nylon material. Preferably, the male part may be formed partially of a fluorocarbon resin such as Teflon™, for added lubricity, and the female part may be formed partially of fiberglass to enhance tensile strength, a fluorocarbon resin, or barium sulphate.

20 Claims, 1 Drawing Sheet

U.S. Patent May 6, 1997 5,626,384 ns and preferably comprises about 20 percent by weight of barium sulfate.

These above described embodiments of the present invention represent significant improvements over prior stabilizer assemblies in minimizing noise that results from relative movement between the male and female parts while in contact with each other.

VEHICLE SLIDING DOOR STABILIZER

FIELD OF THE INVENTION

The present invention relates to stabilizers for doors in vehicles and more particularly to door stabilizers for sliding doors in automobile vans or minivans.

BACKGROUND OF THE INVENTION

Automobile vans or minivans usually include a passenger-side, central cabin door. Unlike standard automobile doors that open out away from the vehicle and are hinged about a vertical axis, the sliding door opens by sliding on wheels or bearings that run within one or more channels in the automobile body, such channels being generally parallel to the longitudinal axis of the vehicle. Such sliding doors are usually larger than the standard doors to provide greater access to the center of the cabin. As a result, the sliding doors often weigh more than the standard door and may require a stabilizer to secure the door in position and to reduce vibration (and resulting noise) during movement of the automobile. Such stabilizers usually include a male part secured to the sliding door and a female part secured to a vertical door frame. The two stabilizer parts are vertically aligned for cooperative engagement when the sliding door is closed. In addition to the standard door latch, this stabilizer arrangement helps to prevent movement of the door relative to the automobile body. It has been found, however, that even slight relative movement between the male and female stabilizer parts when in contact cause unwanted noise, such as material squeaking, which can be heard within the vehicle cabin.

SUMMARY OF THE INVENTION

The present invention seeks to overcome the disadvantages of the prior arrangements by providing a sliding door stabilizer assembly with substantially reduced noise resulting from relative movement between the male and female parts, while in contact.

This advantage is achieved in the present invention by forming the male part of the assembly as a metal support with a molded urethane exterior surface. The female part of the assembly is fabricated from an injection-moldable nylon material. When such parts are in mating relationship, i.e. when the sliding door is closed, squeaking between the urethane part and nylon part is minimal.

In a preferred embodiment, the exterior surface portion of the male part is formed partially, and preferably substantially, of polyurethane. As a further preferred embodiment, the exterior portion of the male part is also formed partially of a fluorocarbon resin, such as Teflon™, to increase lubricity, and preferably comprises about 10 percent by weight of a fluorocarbon resin. Also, the exterior portion of the male part preferably has a hardness in the range of about 66±5 Shore D.

As a preferred embodiment, the female part, in addition to being formed of nylon, is also formed partially of fiberglass to enhance tensile strength, and preferably comprises about 13 to 33 percent by weight of fiberglass, and more preferably comprises about 20 percent by weight of fiberglass. As another preferred embodiment, the female part, in addition to being formed partially of nylon, is also formed partially of a fluorocarbon resin, such as Teflon™, and preferably comprises about 10 percent by weight of a fluorocarbon resin. As yet another preferred embodiment, the female part is formed partially of nylon and partially of barium sulfate,

DETAILED DESCRIPTION

Figure 1:
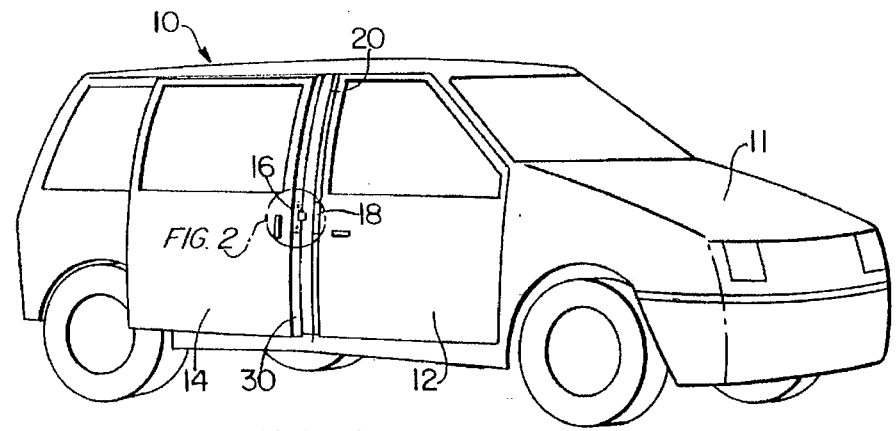
FIG. 1 is a perspective view of a vehicle, such as a minivan, illustrating the location of the sliding door stabilizer assembly of the present invention.
Figure 2:
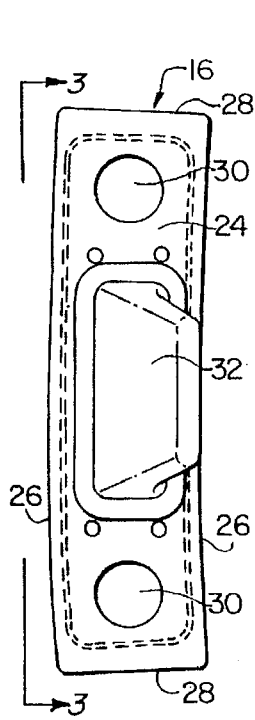
FIG. 2 is a front view of the male part of the stabilizer assembly of the present invention.
Figure 3:
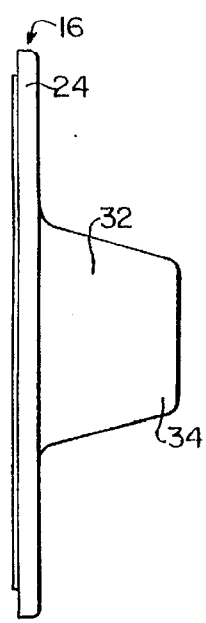
FIG. 3 is a side view of the male part of the stabilizer assembly along the line 3—3 of FIG. 2.
Figure 5:
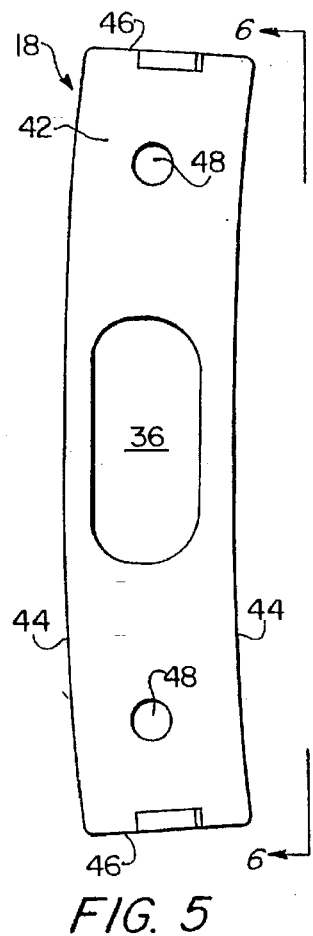
FIG. 5 is a front view of the female part of the stabilizer assembly of the present invention.
Figure 6:
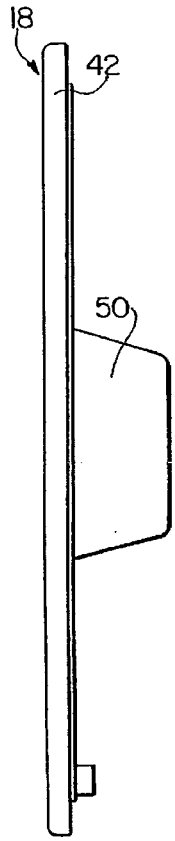
FIG. 6 is a side view of the female part of the stabilizer assembly along the line 6—6 of FIG. 5.

An exemplary vehicle 10 in which the present invention may be utilized is shown as an automobile van or minivan in FIG. 1. In the passenger-side view shown, minivan 10 has a body shown generally at 11 and includes a standard door 12 that is hinged about a vertical axis at the front of the minivan 10 and opens away from the vehicle body in the usual manner. Minivan 10 also includes on the passenger side a generally larger sliding door 14, shown partially opened. The sliding door 14 opens and closes by sliding on wheels or bearings in one or more channels in the vehicle body, such channels running generally parallel to the longitudinal axis of the vehicle. In the vehicle shown, the male member 16 of the stabilizer assembly 22 (FIG. 8) is secured to sliding door 14 and the female member 18 is secured to the vertical door frame 20. Alternatively, the male member 16 may be secured to the door frame 20 and the female member 18 secured to the sliding door 14.

Male part 16 is best shown in FIGS. 2 through 4 and 8. Male part 16 is formed with a generally rectangular base 24 having slightly curved sides 26,26 that meet slightly angled ends 28,28 for compatible attachment to the moderately curved end face 30 of sliding door 14. Two holes 30 are provided in base 24 to permit attachment of male part 16 to sliding door end face 30 by any suitable manner, such as by screws or bolts, for example.

Figure 4:
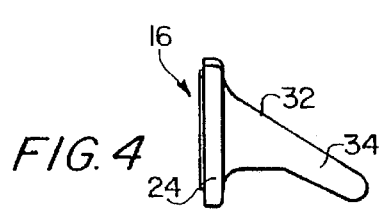
FIG. 4 is a side view along the vertical or long axis of the male part of the stabilizer assembly.

Extending from base 24 is projection 32 that is generally trapezoidal in shape and, as best seen in FIG. 4, is formed at an oblique angle to the plane formed by base 24. Also, as best seen in FIG. 4, projection 32 tapers and terminates in a curved, reduced width penetrating end 34 that is received in an opening 36 of female part 18 (as beat shown in FIG. 8). Opening 36 is sized just slightly larger than penetrating end 34 to provide a snug fit when coupled.

Figure 8:
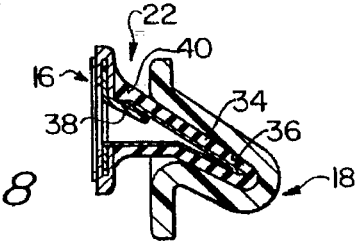
FIG. 8 is a cross-sectional side view along the vertical or long axis of the male and female parts of the stabilizer assembly in mating relationship.

As best shown in FIG. 8, male part 16 includes an inner metal support 38 that is almost completely embedded in a molded urethane outer portion 40. The metal support 38 provides increased rigidity and dimensional stability to male part 16 while the urethane outer portion substantially reduces material squeak against the mating female part 18.

In a preferred embodiment, the outer portion 40 of the male part 16 is formed partially, and preferably substantially, i.e. 90 percent by weight, of polyurethane. As a further preferred embodiment, the outer portion 40 of the male part is also formed partially of a fluorocarbon resin, such as Teflon™, to enhance lubricity, and preferably comprises about 10 percent by weight of a fluorocarbon resin. Also, the outer portion 40 of the male part preferably has a durometer hardness in the range of about 66±5 Shore D.

Female part 18 of stabilizer assembly 22 is best shown in FIGS. 5 through 8. It is fabricated from an injection-moldable nylon material. Female part 18 is formed with a generally rectangular base 42 having slightly curved sides 44,44 that meet slightly angled ends 46,46 for compatible attachment to the moderately curved door frame 20. Two holes 48 are provided in base 42 to permit attachment of female part 18 to door frame 20 by any suitable means, such as by screws or bolts, for example.

Figure 7:
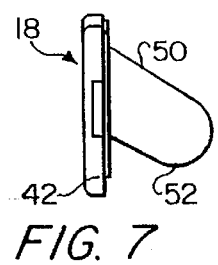
FIG. 7 is a side view along the vertical or long axis of the female part of the stabilizer assembly.

Extending from base 42 is hollow projection 50 that is generally trapezoidal in shape and, as best seen in FIG. 7, is formed at an oblique angle to the plane formed by base 42. Projection 50 terminates in a curved end 52 (FIG. 7), and, referring to FIG. 8, includes an opening 36 that is sized just slightly larger than penetrating end 34 of male part 16 to provide a snug fit when coupled. When female part 18 is attached to door frame 20, projection 50 will extend into the door frame such that base 42 is substantially flush with the face of the door frame. Of course, an alternative is to attach the female part 18 of assembly 22 to sliding door 14 and the male part 16 to the door frame 20.

As a preferred embodiment, the female part 18, in addition to being formed substantially of nylon, preferably about 67 to 90 percent by weight, is also formed partially of fiberglass to enhance tensile strength, and preferably comprises about 13 to 33 percent by weight of fiberglass, and more preferably comprises about 20 percent by weight of fiberglass. As another preferred embodiment, the female part 18, in addition to being formed partially of nylon, is also formed partially of a fluorocarbon resin, such as Teflon™, and preferably comprises about 10 percent by weight of a fluorocarbon resin. As yet another preferred embodiment, the female part 18, is formed partially of nylon and partially of barium sulfate, and preferably comprises about 20 percent by weight of barium sulfate.

While the present invention has been described above in the environment of an automobile minivan, it has applicability to any vehicle, including a boat, plane or train having a sliding door that requires a stabilizer, and which may generate unwanted noise during movement of the vehicle.

From the foregoing detailed description, it will be evident that there are a number of changes, adaptations and modifications of the present invention which come within the province of those persons having ordinary skill in the art to which the present invention pertains. However, it is intended that all such variations not departing from the spirit of the invention be considered as within the scope thereof as limited solely by the appended claims.

I claim:

1. A stabilizer assembly for a sliding door of a vehicle comprising:

a male part including a first portion formed at least partially of urethane;

a female part formed at least partially of nylon.

2. A stabilizer assembly as in claim 1 wherein said male member first portion is formed at least partially of polyurethane.

3. A stabilizer assembly as in claim 1 wherein said male part first portion is formed partially of a fluorocarbon resin.

4. A stabilizer assembly as in claim 3 wherein said male part first portion comprises about 10 percent by weight of a fluorocarbon resin.

5. A stabilizer assembly as in claim 1 wherein said male part first portion has a durometer hardness in the range of about 61 to 71 Shore D.

6. A stabilizer assembly as in claim 1 wherein said male part includes a second portion formed of metal.

7. A stabilizer assembly as in claim 1 wherein said female part is formed partially of fiberglass.

8. A stabilizer assembly as in claim 7 wherein said female part comprises about 13 to 33 percent by weight of fiberglass.

9. A stabilizer assembly as in claim 8 wherein said female part comprises about 20 percent by weight of fiberglass.

10. A stabilizer assembly as in claim 1 wherein said female part is formed partially of a fluorocarbon resin.

11. A stabilizer assembly as in claim 10 wherein said female part comprises about 10 percent by weight of a fluorocarbon resin.

12. A stabilizer assembly as in claim 1 wherein said female part is formed partially of barium sulphate.

13. A stabilizer assembly as in claim 12 wherein said female part comprises about 20 percent by weight of barium sulphate.

14. A stabilizer assembly as in claim 1 wherein said male part first portion comprises about 90 percent by weight of polyurethane.

15. A stabilizer assembly as in claim 1 wherein said female part comprises about 67 to 90 percent by weight of nylon.

16. A stabilizer assembly as in claim 1 wherein said vehicle has a body and at least one door frame that is stationary relative to said body and wherein one of said male or female parts is secured to the sliding door of the vehicle and the other of said male or female parts is secured to said door frame.

17. A stabilizer assembly according to claim 1 wherein said female part includes a base portion attachable to said door frame and a portion defining a recess, said male part includes a base portion attachable to said sliding door and a protruding portion, formed of a metal, an exterior of said base and protruding portions of said male part is provided with a layer of polyurethane and said protruding portion of said male part is receivable within said recess of said female part when said female part is attached to said door frame, said male part is attached to said sliding door and said sliding door is advanced toward said door frame into a closed position.

18. A stabilizer assembly according to claim 17 wherein said protruding portion includes a side surface engageable in wedging relation with a side surface of said recess when said protruding portion is received in said recess whereby a portion of said polyurethane layer disposed on said protruding portion will be interposed between the protruding portion of said male part and said female part when said parts engage in mating relation.

19. A stabilizer assembly according to claim 17 wherein said protruding portion of said male part and said recess of said female part have complementary, converging configurations.

20. A stabilizer assembly according to claim 19 wherein said protruding portion and said recess have complementary trapezoidal configurations.

* * * * *